(12) United States Patent
Tsuji (10) Patent No.: US 9,956,860 B2
(45) Date of Patent: May 1, 2018

(54) REAR STRUCTURE FOR ELECTRIC VEHICLE, AND ELECTRIC VEHICLE INCLUDING SAME

(71) Applicant: HONDA MOTOR CO., LTD., Minato-Ku, Tokyo (JP)

(72) Inventor: Ayumu Tsuji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/290,646

(22) Filed: Oct. 11, 2016

(65) Prior Publication Data
US 2017/0106733 A1 Apr. 20, 2017

(30) Foreign Application Priority Data
Oct. 19, 2015 (JP) .................................. 2015-205741

(51) Int. Cl.
*B60K 1/04* (2006.01)
*B60R 5/04* (2006.01)
*B60L 11/18* (2006.01)

(52) U.S. Cl.
CPC ............ *B60K 1/04* (2013.01); *B60L 11/1822* (2013.01); *B60L 11/1877* (2013.01); *B60R 5/04* (2013.01); *B60K 2001/0416* (2013.01); *B60K 2001/0455* (2013.01); *B60K 2001/0477* (2013.01); *B60Y 2200/112* (2013.01)

(58) Field of Classification Search
CPC .............. B60R 5/04; B60K 2001/0416; B60K 2001/0455
See application file for complete search history.

(56) References Cited

U.S. PATENT DOCUMENTS

| | | | | |
|---|---|---|---|---|
| 3,690,397 | A * | 9/1972 | Parker ...................... | B60K 1/04 180/19.1 |
| 6,641,201 | B1 * | 11/2003 | Pietryga ................... | B60J 7/041 296/100.01 |
| 8,973,691 | B2 * | 3/2015 | Morgan .................... | B60K 1/00 180/291 |
| 2010/0159317 | A1 * | 6/2010 | Taghikhani ............. | B60L 1/003 429/120 |
| 2012/0043773 | A1 * | 2/2012 | Lucas ................. | B60L 11/1877 293/106 |

(Continued)

FOREIGN PATENT DOCUMENTS

JP 2002-130894 A 5/2002

*Primary Examiner* — Brian L Swenson
(74) *Attorney, Agent, or Firm* — Carrier Blackman & Associates, P.C.; Joseph P. Carrier; Fulchand P. Shende (57) ABSTRACT

In a rear structure for an electric vehicle including, at the rear of the vehicle body, an article storage unit supported on a rear frame, and a first lid configured to cover the article storage unit from above, the electric vehicle includes sub batteries serving as a drive source thereof, the sub batteries are stored in a battery storage unit disposed below the article storage unit, the article storage unit and the battery storage unit include an upper opening and a lower opening, respectively, which are open to the rear side of the vehicle, and a second lid configured to cover the upper opening and the lower opening is formed as a member different from the first lid. Such a rear structure for a vehicle is easy to use, and allows many articles be loaded on the article storage unit and be stored therein.

16 Claims, 7 Drawing Sheets

(56) References Cited

U.S. PATENT DOCUMENTS

2012/0048903 A1\* 3/2012 Fowler ................... B60R 5/04
 224/488
2013/0087591 A1\* 4/2013 Cha ........................ B60R 3/02
 224/496

\* cited by examiner

REAR STRUCTURE FOR ELECTRIC VEHICLE, AND ELECTRIC VEHICLE INCLUDING SAME

CROSS-REFERENCE TO RELATED APPLICATIONS

The present invention claims priority under 35 USC 119 based on Japanese Patent Application No. 2015-205741, filed on Oct. 19, 2015. The entire subject matter of this priority document, including specification claims and drawings thereof, is incorporated by reference herein.

BACKGROUND OF THE INVENTION

1. Field of the Invention

The present invention relates to a rear structure for an electric vehicle, and to an electric vehicle including the same. More particularly, the present invention relates to a rear structure for an electric vehicle in which a battery storage unit is disposed below an article storage unit, and to an electric vehicle including the same.

2. Description of the Background Art

There is known a rear structure of a vehicle, in which, at the rear of the vehicle, a casing is provided, cooling units are disposed in the casing, and a refrigerator is provided above the casing. An example of such rear structure for a vehicle is disclosed in the Japanese Patent Application Publication No. 2002-130894.

In the rear structure as disclosed in the Japanese Patent Application Publication No. 2002-130894, the inside of the refrigerator is the only storage space from which articles can be taken in and out of. It is desirable to increase the storage capacity by making the structure such that articles can also be stored in the casing. Further, since the refrigerator greatly projects rearward as compared to the casing, there is a certain limit on the loading of baggage on top of the refrigerator, and it is desirable to increase the load weight. Furthermore, if the vehicle in the Japanese Patent Application Publication No. 2002-130894 is an electric vehicle, a battery may be disposed at the part where the cooling units are disposed. In this case, an easy-to-use structure that allows the battery to be easily taken in and out is desirable.

An object of the present invention is to provide a rear structure for a vehicle which is easy to use and in which many articles can be stored in and loaded on.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, the present invention according to a first aspect thereof provides a rear structure for an electric vehicle including, at a rear of a vehicle body, an article storage unit (55) supported on a vehicle body frame (100), and a first lid (61) configured to cover the article storage unit (55) from above, in which the electric vehicle (10) includes a battery (16B) serving as a drive source thereof, the battery (16B) is stored in a battery storage unit (56) disposed below the article storage unit (55), each of the article storage unit (55) and the battery storage unit (56) includes an opening portion (68A, 68B) open to an outside, and a second lid (62) configured to cover the opening portion (68A, 68B) is formed as a member different from the first lid (61).

The above-described configuration, according to a second aspect of the present invention, may be such that an article loading member (57) on which baggage is capable of being loaded is provided at an upper surface (61c) of the first lid (61), and the first lid (61) in a closed state is in contact with and supported by an upper surface of the vehicle body frame (100).

The above-described configurations, according to a third aspect of the present invention, may be such that the second lid (62) includes an inner surface (62a) continuing to a bottom surface (56a) of the battery storage unit (56) in a state where the second lid (62) is open, and a guide portion (77) is provided on the inner surface (62a) of the second lid (62), the guide portion (77) being configured to guide the battery (16B) when the battery (16B) is taken in and out of the battery storage unit (56).

The above-described configurations, according to a fourth aspect of the present invention, may be such that a bottom surface (56a) of the battery storage unit (56) is an inclined surface inclined obliquely upward toward a rear side of the vehicle body.

The above-described configurations, according to a fifth aspect of the present invention, may be such that the article storage unit (55) includes a first bottom surface (55b) and a second bottom surface (55c) formed at a position lower than the first bottom surface (55b), and the second bottom surface (55c) is provided at a position closer to the corresponding opening portion (68A) than the first bottom surface (55b) is.

The above-described configurations, according to a sixth aspect of the present invention, may be such that the upper surface (61c) of the first lid (61) is inclined downward toward a front side, and the vehicle body frame (100) includes a cross frame (66) situated above and forward of the upper surface (61c) and extending in a vehicle width direction.

The above-described configurations, according to a seventh aspect of the present invention, may be such that a side loading member (78) on which baggage is capable of being loaded is provided outward of the article loading member (57) in a vehicle width direction, and an upper surface (61c) of the article loading member (57) and an upper surface (78c) of the side loading member (78) are formed at a same height.

Effects of the Invention

The electric vehicle of the present invention includes a battery serving as a drive source thereof, the battery is stored in the battery storage unit, disposed below the article storage unit, each of the article storage unit and the battery storage unit includes an opening portion open to the outside, and the second lid, configured to cover the opening portion, is formed as a member different from the first lid. Accordingly, baggage stored in the article storage unit can be taken out not only through the first lid but also through the second lid. Moreover, when the second lid is open, not only baggage can be taken in and out of the article storage unit but also the battery can be taken in and out. Hence, an easy-to-use storage structure can be provided. Moreover, the storage capacity can be increased by providing the battery storage unit in addition to the article storage unit.

Also, the article loading member, on which baggage is capable of being loaded, may be provided at the upper surface of the first lid, and the first lid in the closed state may be in contact with and supported by the upper surface of the vehicle body frame. Since the first lid can be supported by the vehicle body frame, the amount of baggage that can be loaded on the first lid can be large. Hence, an easy-to-use load structure can be provided.

Also, the second lid may include an inner surface continuing to the bottom surface of the battery storage unit in the state where the second lid is open, and the guide portion is provided on the inner surface of the second lid, the guide portion being configured to guide the battery when the battery is taken in and out of the battery storage unit. In this way, it is easier to take in and out the battery, which is heavy. Hence, an easy-to-use structure can be provided.

Also, the bottom surface of the battery storage unit may be an inclined surface inclined obliquely upward toward the rear side. Thus, the battery can be slid on the inclined surface and stored into the battery storage unit. In this way, it is easier to store the battery. Hence, a battery storage structure that is easy to use for the driver and a passenger can be provided.

Also, the article storage unit may include the first bottom surface and the second bottom surface formed at a position lower than the first bottom surface, and the second bottom surface may be provided at a position closer to the corresponding opening portion than the first bottom surface is. Accordingly, baggage can be easily put on and off the second bottom surface. Also, the structure is such that if the driver or the passenger wants to store baggage by opening the first lid and then take it out by opening the second lid, the driver or the passenger can easily figure out where to place the baggage in order to easily take it out when opening the second lid, since a step is formed between the first bottom surface and the second bottom surface. Hence, an easy-to-use structure can be provided.

Also, the upper surface of the first lid may be inclined downward toward the front side, and the vehicle body frame may include the cross frame, situated above and forward of the upper surface of the first lid and extending in the vehicle width direction. Thus, by loading baggage on the upper surface of the first lid and bringing the baggage into contact with the cross frame, the baggage can be positioned. In this way, the baggage can be stable.

Also, the side loading member, on which baggage is capable of being loaded, may be provided outward of the article loading member in the vehicle width direction, and the upper surface of the article loading member and the upper surface of the side loading member may be formed at the same height. Accordingly, the load part on which baggage is capable of being loaded further increases in area and thus increases in amount of load accordingly. Also, since no step is present between the article loading member and the side loading member, large baggage can be loaded thereon more stably.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, it may be noted that the directional terms such as front, rear, left, right, upper, and lower in the description are identical to the directions relative to a vehicle body unless otherwise noted. Also, reference signs FR, UP, and LH given in the drawings denote the front, upper, and left sides of the vehicle body, respectively.

Figure 1:
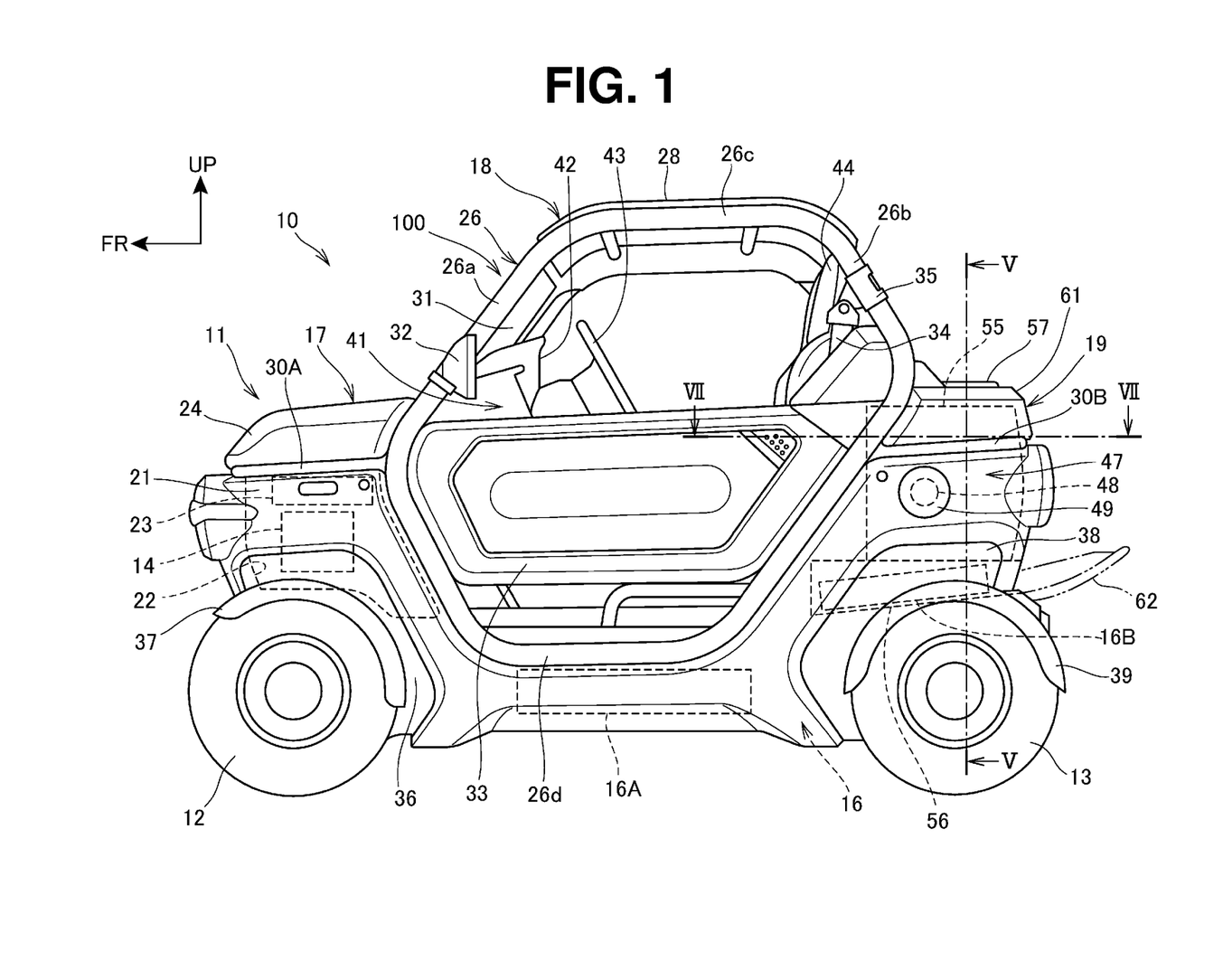
FIG. 1 is a left-side view illustrating an electric vehicle in an embodiment of the present invention.

FIG. 1 is a left-side view illustrating an electric vehicle 10 according to an embodiment of the present invention.

The electric vehicle 10 includes: a body 11; a pair of left and right front wheels 12 provided at a front section of the body 11; a pair of left and right rear wheels 13 provided at a rear section of the body 11; an electric motor 14 configured to drive the left and right front wheels 12; and a battery 16 configured to drive the electric motor 14.

The battery 16 includes a main battery 16A disposed at a lower section of the body 11 and a plurality of sub batteries 16B detachably disposed at the rear section of the body 11.

The body 11 includes a front body 17, a cabin 18, and a rear body 19 provided in this order from the front side to the rear side.

The front body 17 includes: a pair of left and right front fenders 21 covering the left and right front wheels 12 from above; and a motor compartment 22 provided between the left and right front fenders 21 and housing the electric motor 14. Besides the electric motor 14, the motor compartment 22 houses a PCU (power control unit) 23 configured to control the drive and power generation (regeneration) of the electric motor 14. An opening at the top of the motor compartment 22 is covered by an openable and closable hood 24.

The electric vehicle 10 is a front-wheel drive vehicle whose left and right front wheels 12 are driven through a transmission not illustrated upon actuation of the electric motor 14 by electric power from the battery 16. The electric motor 14 serves also as a power generator configured to generate electric power with rotation of the left and right front wheels 12, and the electric power generated by the electric motor 14 charges the battery 16 through the PCU 23.

Each front fender 21 is provided with a front wheelhouse 36 surrounding the front wheel 12 from the upper side, the rear side, and the inner side in the vehicle width direction. A sub front fender 37 is disposed in proximity to the upper side of the front wheel 12 to cover the front wheel 12 from above.

The cabin 18 includes: a pair of left and right annular loop frames 26; a floor panel (not illustrated) provided on lower portions of the loop frames 26 and serving as a floor; and a roof 28 attached to upper end portions of the loop frames 26.

Each loop frame 26 includes a front pillar 26a, a rear pillar 26b, a roof side frame 26c, and a side sill 26d integrally with each other. A front frame 30A extends forward from the front pillar 26a. A rear frame 30B extends rearward from the rear pillar 26b.

A windshield 31 is attached to the left and right front pillars 26a, and a side mirror 32 and a door 33 are attached to an upper portion and a lower portion of each front pillar 26a, respectively. Each rear pillar 26b is provided on the rear body 19 side, and a seatbelt support bracket 35 is attached to the rear pillar 26b, the seatbelt support bracket 35 supporting an end portion of a seatbelt 34 which the driver or a passenger wears.

The left and right roof side frames 26c are sections connecting the upper ends of the left and right front pillars 26a and the upper ends of the left and right rear pillars 26b, and the roof 28 is attached thereto. Each side sill 26d forms a lower end portion of the loop frame 26 and connects the front body 17 and the rear body 19.

Inside the cabin 18, there are provided: an instrument panel 41 situated in front of the driver and the passenger; meters 42 provided on instrument panel 41; a steering wheel 43 disposed to project from the instrument panel 41 toward the driver and the passenger; and a plurality of sheets 44 for the driver and the passenger to sit aligned in the vehicle width direction.

A pair of left and right rear side panels 47 provided to the rear body 19 are each provided with a rear wheelhouse 38 surrounding the corresponding rear wheel 13 from the upper side, the front side, and the inner side in the vehicle width direction. A sub rear fender 39 is disposed in proximity to the upper side of the rear wheel 13 to cover the rear wheel 13 from above. Also, one of the rear side panels 47 includes a charge port 48 to which to connect an external power source's charge connector to charge the battery 16, and a charge-port lid 49 covering the charge port 48.

The rear body 19 includes: an article storage unit 55 configured to store articles; a battery storage unit 56 provided below the article storage unit 55 for storing the sub batteries 16B; and an article loading member 57 provided above the article storage unit 55 for loading articles thereon.

Figure 2:
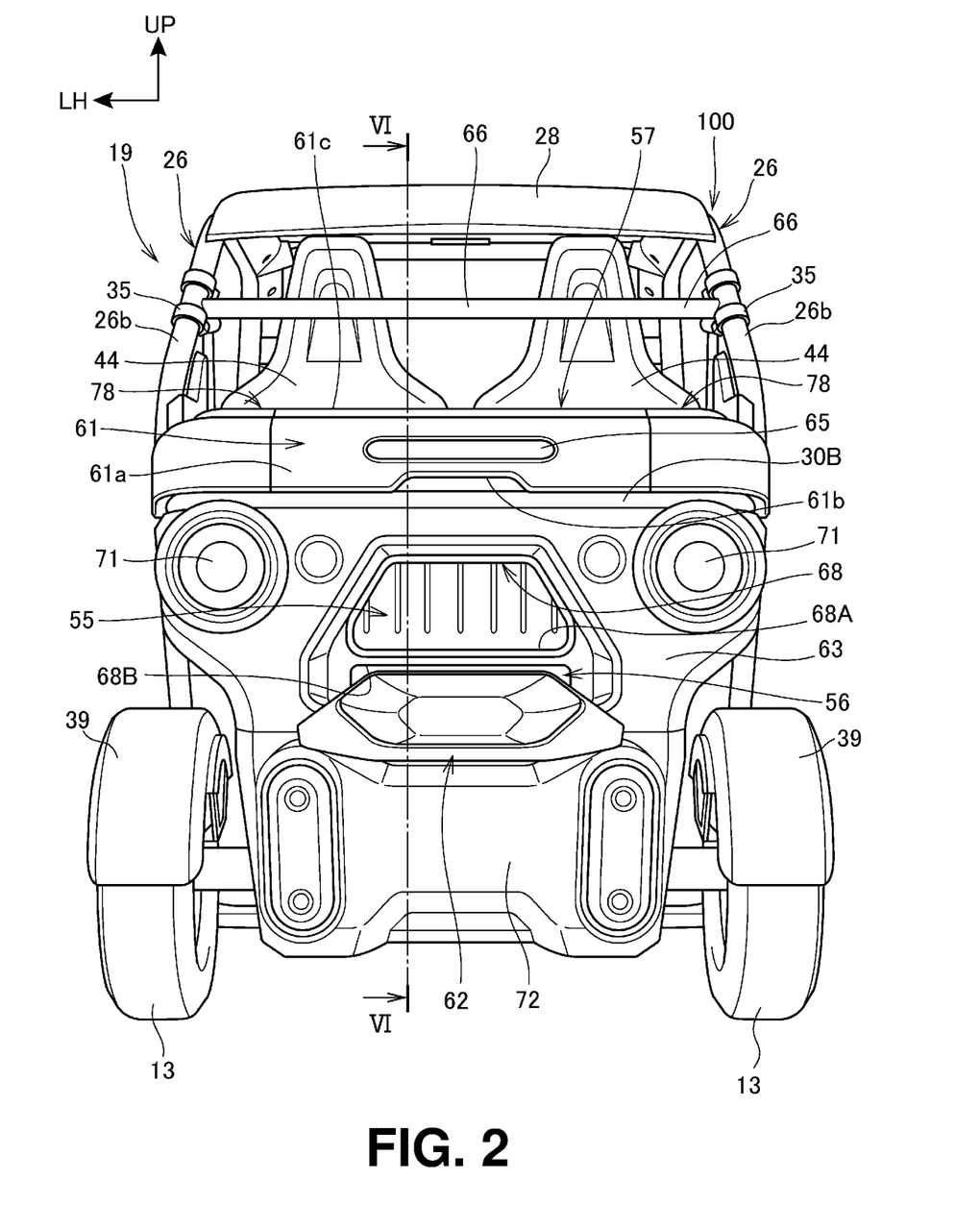
FIG. 2 is a rear view illustrating the electric vehicle.

FIG. 2 is a rear view illustrating the electric vehicle 10.

The article storage unit 55 includes a first lid 61 provided openably and closably behind the left and right seats 44, 44 and above the rear frame 30B and a second lid 62 provided openably and closably on a rear panel 63 forming the rear surface of the rear body 19, so that articles can be taken in and out. Specifically, articles can be taken in and out of the article storage unit 55 by opening one or both of the first lid 61 and the second lid 62. In FIG. 2, the first lid 61 is a closed state, and the second lid 62 is an open state.

The first lid 61 in the closed state is in contact with and supported by the upper surface of the rear frame 30B. In a rear surface 61a of the first lid 61, a horizontally elongated recess 61b is formed on which to place the hand when opening and closing the first lid 61. A high-mount stop lamp 65 formed in a horizontally elongated shape is provided above the recess 61b. A rear upper cross frame 66 extends in the vehicle width direction and is laid between the left and right loop frames 26, 26. The rear upper cross frame serves as a stopper configured to regulate the maximum opening angle of the first lid 61 in the open state.

An upper surface 61c of the first lid 61 forms the article loading member 57, or a plate-shaped article loading member 57 as a different member is attached to the top of the first lid 61.

In its center section in the vehicle width direction, the rear panel 63 is provided with a storage opening portion 68 as openings of the article storage unit 55 and the battery storage unit 56. The second lid 62 is openably and closably provided to cover the storage opening portion 68.

The rear panel 63 is also provided with a pair of left and right circular tail lamps 71, 71 on the opposite sides of the storage opening portion 68 in the vehicle width direction, and with a rear bumper 72 below the storage opening portion 68.

Figure 3:
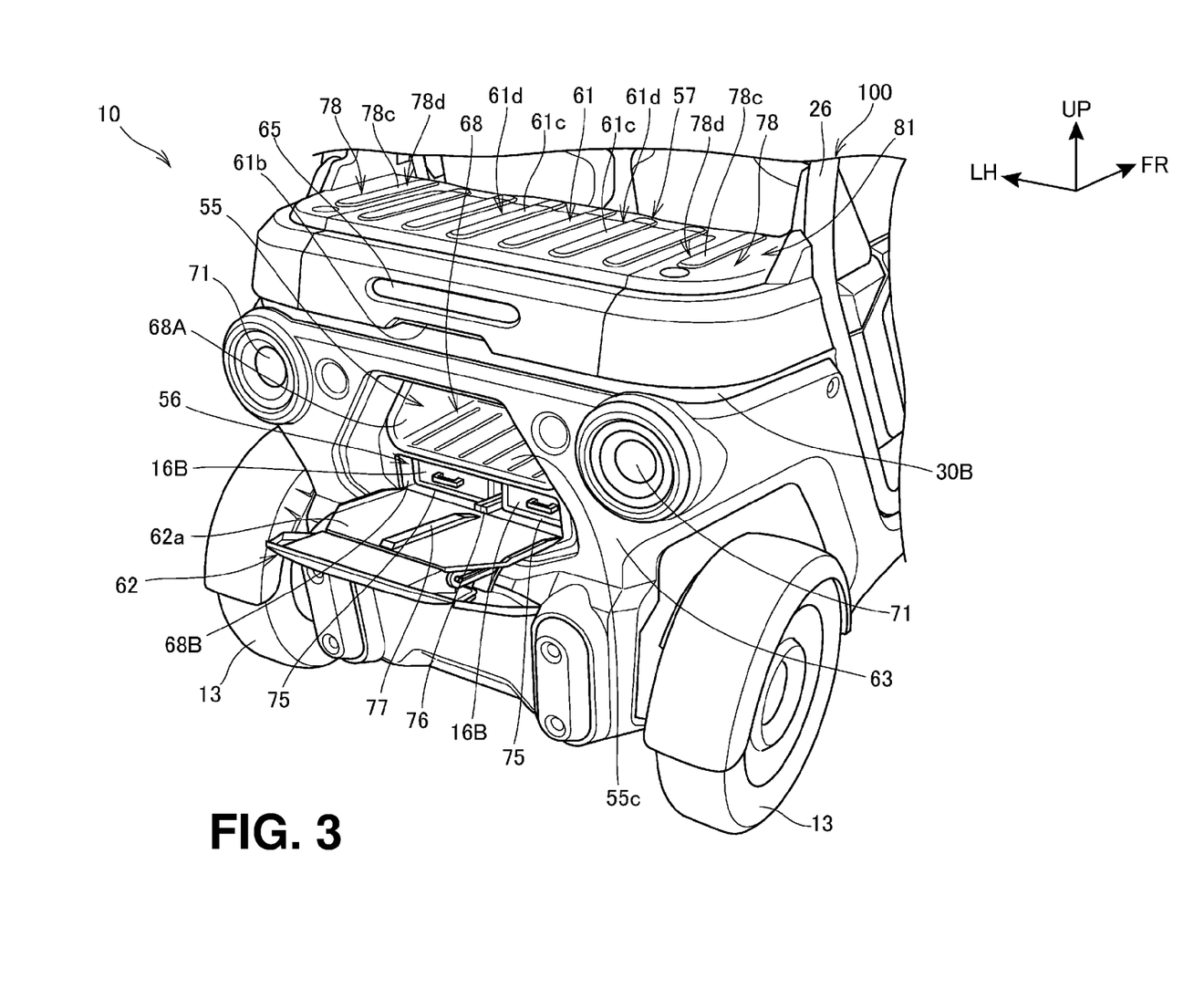
FIG. 3 is a perspective view illustrating the rear of the electric vehicle.

FIG. 3 is a perspective view illustrating the rear of the electric vehicle 10.

The battery storage unit 56 with a pair of left and right sub batteries 16B, 16B stored therein is provided below the article storage unit 55. The storage opening portion 68 includes an upper opening 68A as the opening of the article storage unit 55 and a lower opening 68B as the opening of the battery storage unit 56.

Specifically, the battery storage unit 56 stores a pair of left and right sub-battery storage cases 75, 75, and the left and right sub-battery storage cases 75, 75 each store a sub battery 16B.

Each sub battery 16B can be charged in the stored state. Alternatively, each sub battery 16B can be taken out of its sub-battery storage case 75 and charged by an external power source.

A guiderail 76 extending in the front-rear direction is provided between the left and right sub-battery storage cases 75, 75. The guiderail 76 guides the sub-battery storage cases 75 when they are taken in and out of the battery storage unit 56.

In the state where the second lid 62 is open, an inner surface 62a of the second lid 62 is inclined downward toward the front side. A lid-side guide portion 77 is provided on a center section of the inner surface 62a in the vehicle width direction.

With the inner surface 62a of the second lid 62 inclined downward toward the front side as described above, the sub batteries 16B, which are heavy objects, can be placed and slid on the inner surface 62a of the second lid 62, and therefore easily stored into the sub-battery storage cases 75. Moreover, with the lid-side guide portion 77 provided, it is easier to guide the sub batteries 16B into the sub-battery storage cases 75.

A pair of left and right side loading members 78, 78 are provided by the opposite sides of the first lid 61 in the vehicle width direction, the left and right side loading members 78, 78 being supported by the rear frame 30B. A plurality of protrusions 61d protruding upward and extending in the front-rear direction are formed on the first lid 61 next to each other in the vehicle width direction. Also, protrusions 78d protruding upward and extending in the front-rear direction are formed on the side loading members 78 next to the protrusions 61d in the vehicle width direction.

The upper surface 61c of the first lid 61 (specifically upper surfaces 61c of the protrusions 61d) and upper surfaces 78c, 78c of the left and right side loading members 78, 78 (specifically upper surfaces 78c of the protrusions 78d) are at the same height, and the article loading member 57 and the side loading members 78, 78 form a rear load part 81 longer in the vehicle width direction than in the front-rear direction. A pivot shaft about which the first lid 61 is swung when opened and closed is provided on front portions of the inner side surfaces of the left and right side loading members 78, 78.

Figure 4:
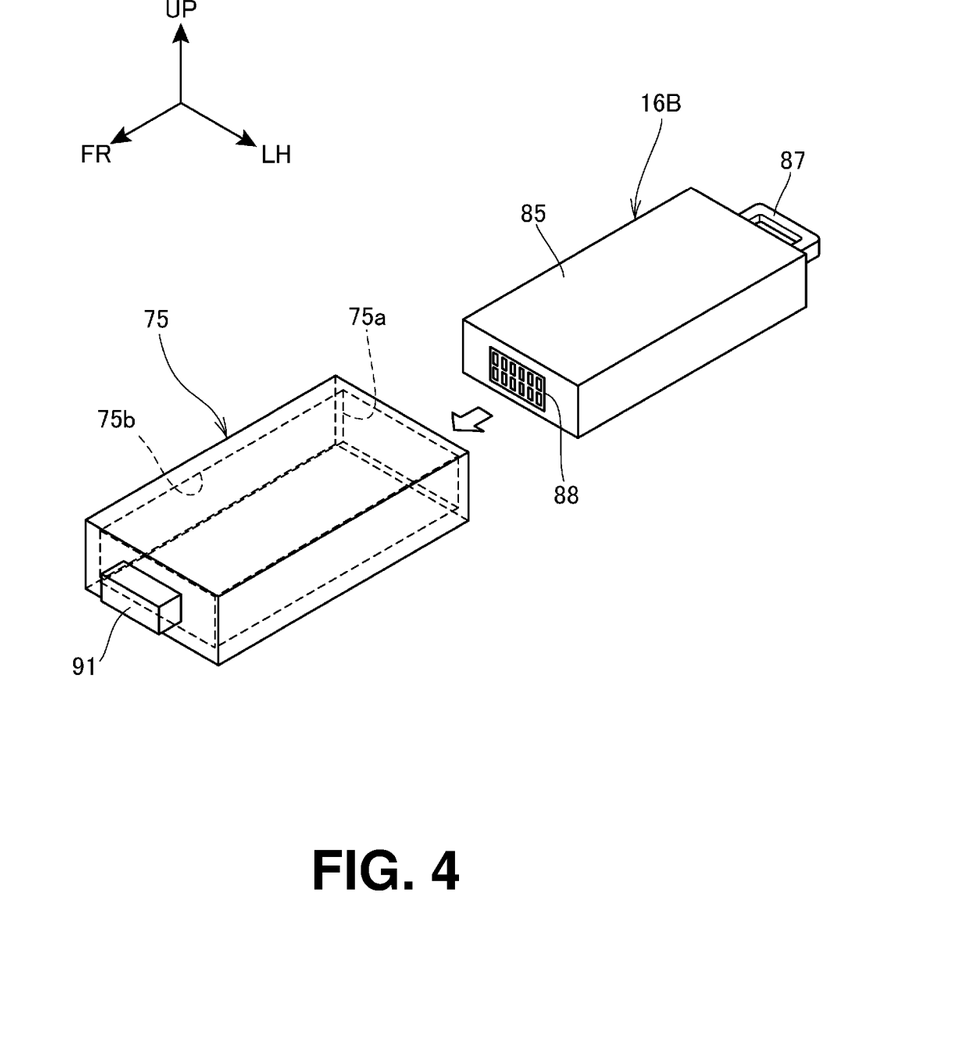
FIG. 4 is a perspective view illustrating a sub battery and a sub-battery storage case.

FIG. 4 is a perspective view illustrating one of the sub batteries 16B and its sub-battery storage case 75.

Each sub battery 16B includes a plurality of battery cells connected in series and housed in a battery case 85 that has a vertically thin flat box shape. A handle 87 to be grabbed by the hand is provided on one end surface of the sub battery 16B in its longitudinal direction, while a female connector 88 to be electrically connected to the sub-battery storage case 75 side is provided in the other end surface.

The outer shape of the sub-battery storage case 75 is a cuboidal box shape. At one of the six surfaces of the cuboid, a case opening 75a is provided through which the sub battery 16B is inserted as illustrated by the outlined arrow. Also, a male connector 91 is provided at another one of the six surfaces of the cuboid that faces the surface at which the case opening 75a is provided. The male connector 91 is connected to the PCU 23 (see FIG. 1) through a harness. The male connector 91 includes therein a plurality of terminals projecting into a hollow portion 75b provided in the sub-battery storage case 75 for inserting the sub battery 16B. The plurality of terminals are inserted into and electrically connected to the female connector 88 of the sub battery 16B, so that the sub battery 16B is connected to the electric motor 14 through the PCU 23 as in the main battery 16A (see FIG. 1).

The sub battery 16B can be taken out and used as a power source in a different electric vehicle such as a motorcycle including the sub-battery storage case 75, by storing and connecting the sub battery 16B in and to that sub-battery storage case 75.

Figure 5:
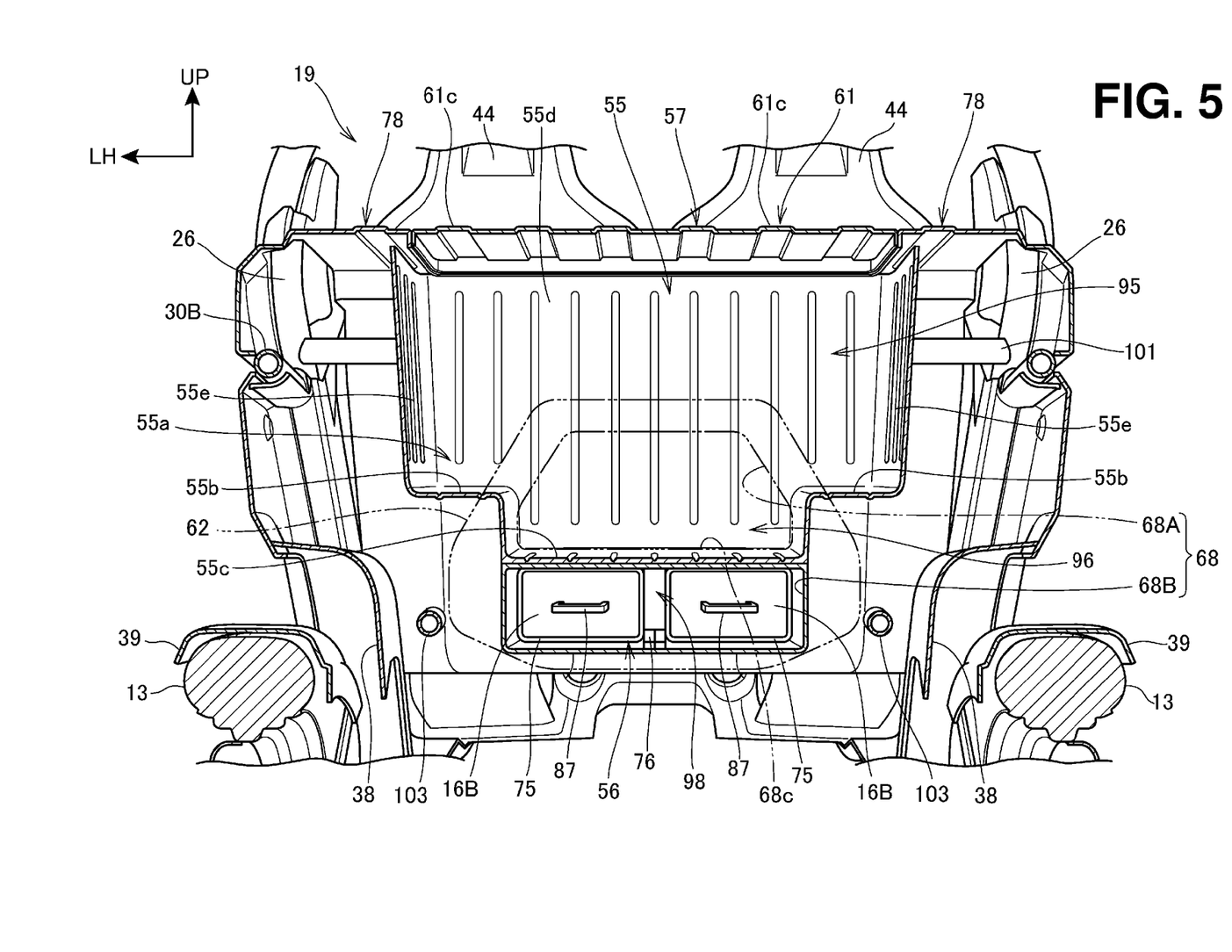
FIG. 5 is a cross-sectional view taken along line V-V in FIG. 1.

FIG. 5 is a cross-sectional view taken along line V-V in FIG. 1.

In FIG. 5, the outline of each of the second lid 62, the upper opening 68A, and the lower opening 68B is illustrated by a phantom line.

The rear body 19 includes the article storage unit 55 and the battery storage unit 56, which is provided below and adjacently to the article storage unit 55. The article storage unit 55 and the battery storage unit 56 are provided as different members, and are each made of resin.

A bottom surface 55a of the article storage unit 55 includes: a pair of left and right first bottom surfaces 55b, 55b provided on outer sides in the vehicle width direction; and a second bottom surface 55c formed between the left and right first bottom surfaces 55b, 55b at a position lower than the first bottom surfaces 55b.

A first storage space 95 above the left and right first bottom surfaces 55b, 55b can house wide baggage, and such baggage can be taken into and out of the first storage space 95 by opening the first lid 61. Also, a second storage space 96 below the first bottom surfaces 55b but above the second bottom surface 55c can store small articles, and such baggage can be taken in and out of the second storage space 96 by opening at least one of the first lid 61 and the second lid 62.

Further, since the second bottom surface 55c is formed at such a position as to be exposed from the upper opening 68A, baggage placed on the second bottom surface 55c can be easily taken in and out. Furthermore, the structure is such that if, for example, the driver or the passenger wants to store baggage by opening the first lid 61 and then take it out by opening the second lid 62, he or she can easily figure out where to place the baggage in order to easily take it out when opening the second lid 62, since a step is formed between each first bottom surface 55b and the second bottom surface 55c. Hence, an easy-to-use structure can be provided.

If the driver or the passenger closes the first lid 61 and then loads baggage on the article loading member 57, the driver or the passenger can take out an article in the article storage unit 55 by opening the second lid 62, without having to take the baggage off the article loading member 57. Hence, an easy-to-use structure can be provided.

The greatest width of the upper opening 68A of the storage opening portion 68 in the vehicle width direction is less than the width of the second storage space 96 in the vehicle width direction (i.e. the width of the second bottom surface 55c in the vehicle width direction). Also, a lower edge 68c of the upper opening 68A is higher than the second bottom surface 55c. Baggage in the second storage space 96 is less likely to pop out when the second lid 62 is opened, by making the greatest width of the upper opening 68A in the vehicle width direction less than the width of the second storage space 96 in the vehicle width direction and making the lower edge 68c of the upper opening 68A higher than the second bottom surface 55c in a rear view as described above.

The width of the lower opening 68B of the battery storage unit 56 in the vehicle width direction is substantially equal to the width of the second storage space 96 in the vehicle width direction. A space 98 is formed above the guiderail 76 and between the left and right sub-battery storage cases 75, 75, which are stored in the battery storage unit 56. With the space 98, the inside of the battery storage unit 56 can be ventilated, thereby promoting heat dissipation from the sub batteries 16B.

Figure 6:
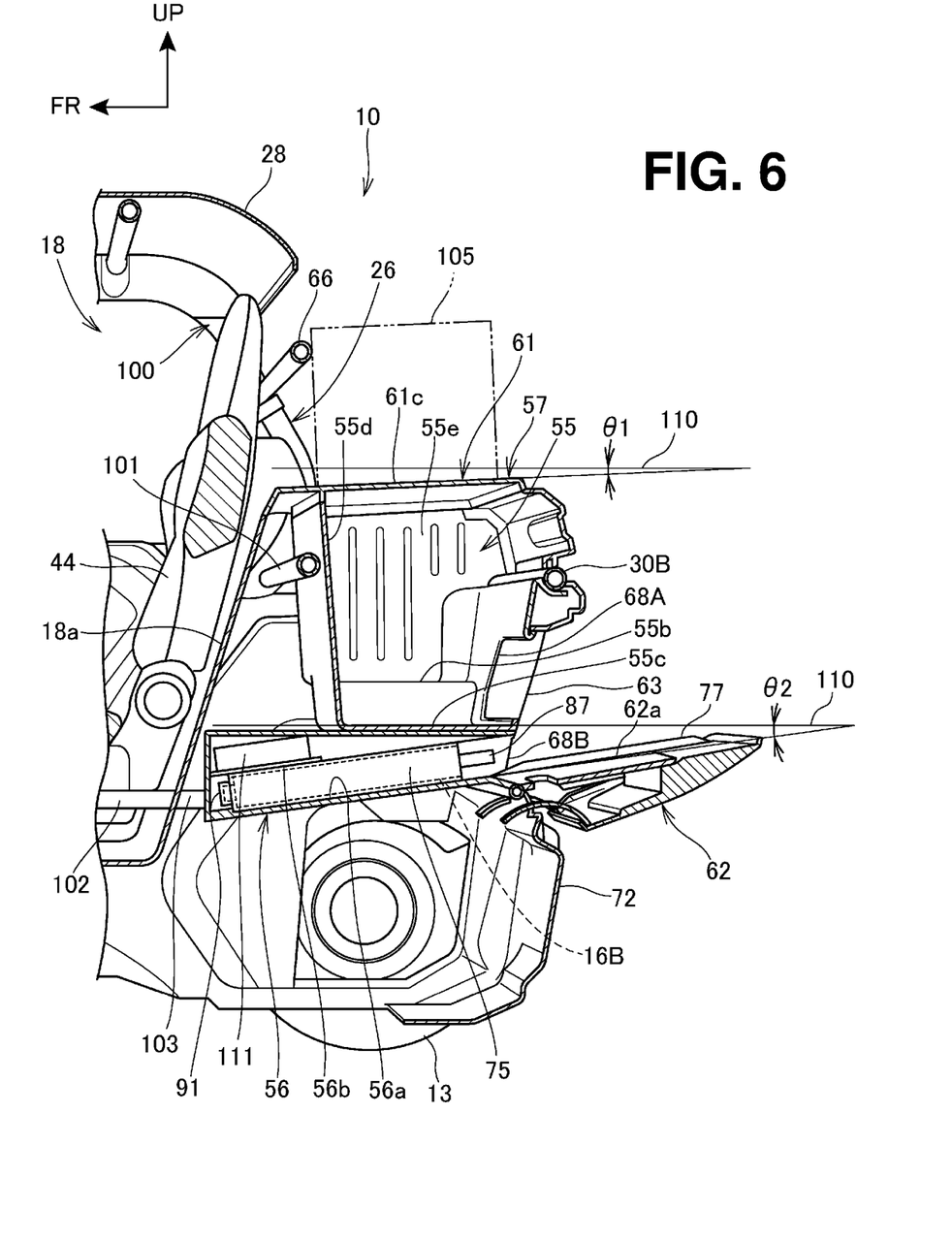
FIG. 6 is a cross-sectional view taken along line VI-VI in FIG. 2.

FIG. 6 is a cross-sectional view taken along line VI-VI in FIG. 2.

In addition to the loop frames 26, the front frame 30A (see FIG. 1), the rear frame 30B, and the rear upper cross frame 66, a vehicle body frame 100, which serves as the skeleton of the electric vehicle 10, includes: a rear lower cross frame 101 laid between the left and right loop frames 26 and disposed in front of and in proximity to the article storage unit 55; a pair of left and right under frames 102 supporting lower portions of the seats 44; and a pair of left and right rear under frames 103 extending from rear end portions of the under frames 102 to the rear body 19 behind them.

The article storage unit 55 and the battery storage unit 56 are provided as different members, and the article storage unit 55 is supported on the rear frame 30B while the battery storage unit 56 is supported on the rear under frames 103. The battery storage unit 56 is provided to protrude farther toward the front side than the article storage unit 55, and extends to the proximity of a rear wall 18a of the cabin 18.

The structure of the first lid 61 is such that its upper surface 61c is inclined downward toward the front side, thereby making it easier to move baggage 105 loaded on the upper face to the rear upper cross frame 66. The baggage 105 is positioned by the rear upper cross frame 66. By restraining the baggage 105 in this state with role or the like, the baggage 105 can be carried stably. The upper surface 61c is inclined with respect to a horizontal line 110 at the inclination angle of θ1. A rear end portion of the first lid 61 in the closed state is in contact with and supported by the upper surface of the rear frame 30B. Such arrangement can further increase the allowable maximum load weight of the article loading member 57.

A bottom surface 56a of the battery storage unit 56 is inclined downward toward the front side, and the inner surface 62a of the second lid 62 in the open state is likewise inclined downward toward the front side. The bottom surface 56a inclined with respect to the horizontal line 110 at the inclination angle of θ2, and the inclination angle of the inner surface 62a of the second lid 62 is also substantially equal to the inclination angle θ2. The inclination angle θ2 is greater than the inclination angle θ1 of the upper surface 61c of the first lid 61.

In the battery storage unit 56, a partition plate 56b is provided which vertically partitions a front portion of the inside of the battery storage unit 56, and a charger 111 is provided on the partition plate 56b.

The charger 111 is connected to the male connector 91 of each sub-battery storage case 75 through a harness. The charger 111 includes an extension cord with a plug to be connected to a socket of a commercial power source serving as an external power source.

The second lid 62 includes a hinge with which to open and close the second lid 62, on the rear panel 63 below the lower opening 68B.

Figure 7:
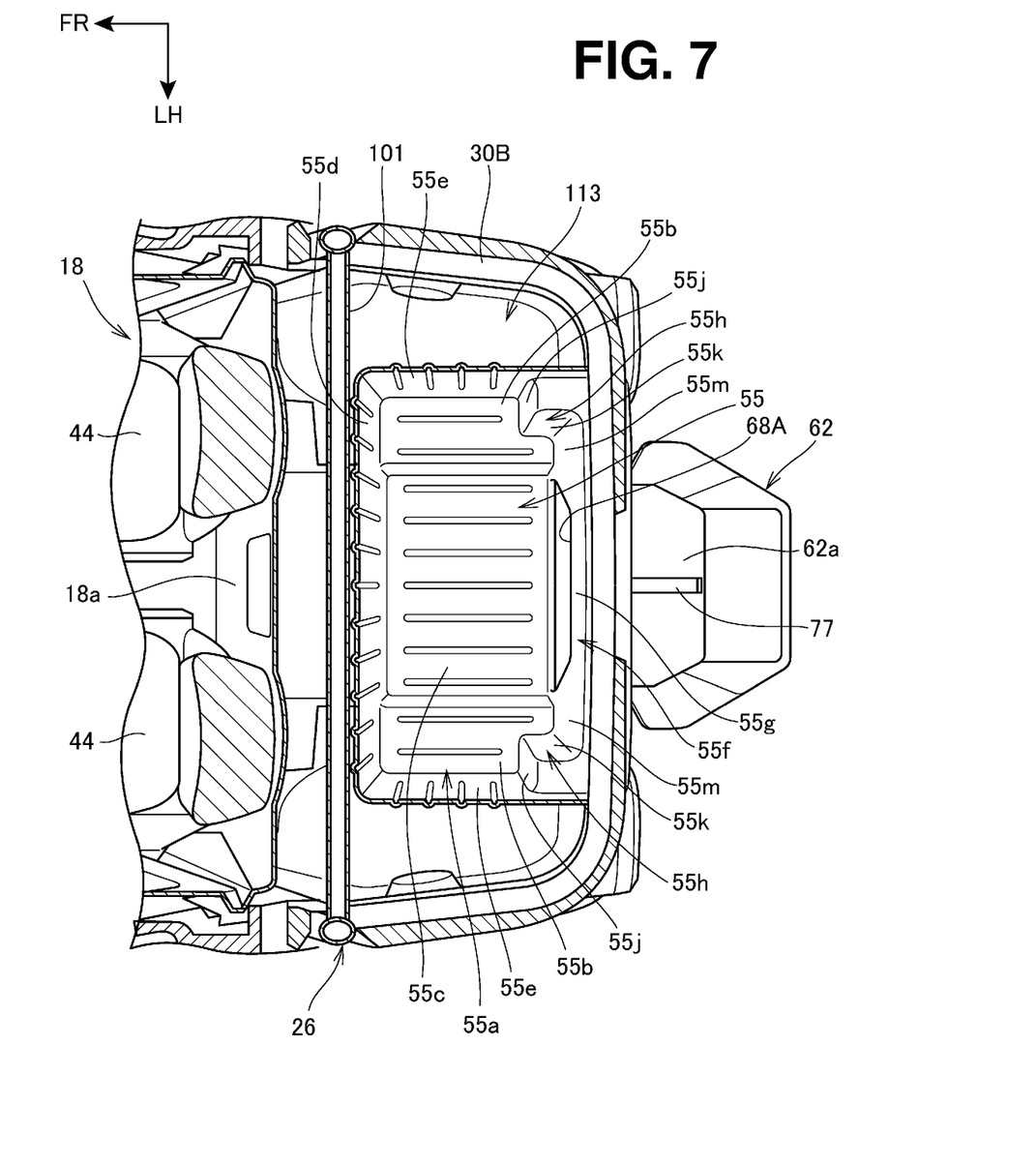
FIG. 7 is a cross-sectional view taken along line VII-VII in FIG. 1.

FIG. 7 is a cross-sectional view taken along line VII-VII in FIG. 1.

In a plan view, the article storage unit 55 is disposed in a space 113 surrounded by the rear frame 30B and the rear lower cross frame 101.

The first bottom surfaces 55b are each formed in a substantially rectangular shape longer in the front-rear direction. The second bottom surface 55c is formed in a rectangular shape longer in the vehicle width direction, and is situated in front of the upper opening 68A.

The article storage unit 55 includes the bottom surface 55a, and a front surface 55d, left and right side surfaces 55e, 55e, and a rear surface 55f rising from the front edge, the opposite side edges, and the rear edge of the bottom surface 55a, respectively.

The front surface 55d rises from the front edge of each of the first bottom surfaces 55b and the second bottom surface 55c. The side surfaces 55e rise from side edges of the first bottom surfaces 55b. The rear surface 55f includes an opening-side rear surface 55g formed above the upper opening 68A, and side rear surfaces 55h rising from the rear edge of the second bottom surface 55c.

Each side rear surface 55h is a portion provided outward of the upper opening 68A in the vehicle width direction, and includes a first front wall surface 55j facing forward, an inner wall surface 55k facing inward in the vehicle width direction, and a second front wall surface 55m situated rearward of the first front wall surface 55j and facing forward. The first front wall surface 55j and the second front wall surface 55m regulate rearward movement of baggage loaded on the first bottom surface 55b.

In the plan view, the second lid 62 in the open state is formed in a substantially trapezoidal shape which gradually tapers toward the rear side of the vehicle.

As illustrated in FIG. 3 and FIG. 6 above, in the rear structure for the electric vehicle 10, including, at the rear of the vehicle body, the article storage unit 55, supported on the vehicle body frame 100 (specifically the rear frame 30B), and the first lid 61, configured to cover the article storage unit 55 from above, the electric vehicle 10 includes the sub batteries 16B as a battery serving as a drive source thereof, each of the sub batteries 16B is stored in the battery storage unit 56, disposed below the article storage unit 55, the article storage unit 55 and the battery storage unit 56 includes the upper opening 68A and the lower opening 68B, respectively, as an opening portion open to the outside (specifically the rear side of the vehicle), and the second lid 62, configured to cover the upper opening 68A and the lower opening 68B, is formed as a member different from the first lid 61.

With such configuration, baggage stored in the article storage unit 55 can be taken out not only by opening the first lid 61 but also by opening the second lid 62. Also, baggage can be stored into the article storage unit 55 not only by opening the first lid 61 but also by opening the second lid 62. Moreover, when the second lid 62 is open, not only baggage can be taken in and out of the article storage unit 55 but also the sub batteries 16B can be taken in and out. Hence, an easy-to-use storage structure can be provided. Moreover, the storage capacity can be increased by providing the battery storage unit 56 in addition to the article storage unit 55.

Also, as illustrated in FIG. 6, the article loading member 57, on which baggage is capable of being loaded, is provided at the upper surface 61c of the first lid 61, and the first lid 61 in the closed state is in contact with and supported by the upper surface of the vehicle body frame 100 (specifically the rear frame 30B). Since the first lid 61 can be supported by the vehicle body frame 100, the amount of baggage that can be loaded on the first lid 61 can be large. Hence, an easy-to-use load structure can be provided.

Also, as illustrated in FIG. 3 and FIG. 6, the second lid 62 includes the inner surface 62a, continuing to the bottom surface 56a of the battery storage unit 56 in the state where the second lid 62 is open, and the lid-side guide portion 77 is provided on the inner surface 62a of the second lid 62 as a guide portion configured to guide the sub batteries 16B when the sub batteries 16B are taken in and out of the battery storage unit 56. Accordingly, it is easier to take in and out the sub batteries 16B, which are heavy. Hence, an easy-to-use structure can be provided.

Also, as illustrated in FIG. 6, the bottom surface 56a of the battery storage unit 56 is an inclined surface inclined obliquely upward toward the rear side. Thus, the sub batteries 16B can be slid on the inclined surface and stored into the battery storage unit 56. Accordingly, it is easier to store the sub batteries 16B. Hence, a battery storage structure that is easy to use for the driver and the passenger can be provided.

Also, as illustrated in FIG. 5 and FIG. 7, the article storage unit 55 includes the first bottom surfaces 55b and the second bottom surface 55c, formed at a position lower than the first bottom surfaces 55b, and the second bottom surface 55c is provided at a position closer to the upper opening 68A than the first bottom surfaces 55b are. Accordingly, baggage can be easily put on and off the second bottom surface 55c. Also, the structure is such that if the driver or the passenger wants to store baggage by opening the first lid 61 and then take it out by opening the second lid 62, he or she can easily figure out where to place the baggage in order to easily take it out when opening the second lid 62, since a step is formed between each first bottom surface 55b and the second bottom surface 55c. Hence, an easy-to-use structure can be provided.

Also, as illustrated in FIG. 2 and FIG. 6, the upper surface 61c of the first lid 61 is inclined downward toward the front side, and the vehicle body frame 100 includes the rear upper cross frame 66 as a cross frame situated above and forward of the upper surface 61c and extending in the vehicle width direction. Thus, by loading baggage 105 on the upper surface 61c of the first lid 61 and bringing the baggage 105 into contact with the rear upper cross frame 66, the baggage 105 can be positioned. Accordingly, the baggage 105 can be stable.

Also, as illustrated in FIG. 3, the side loading members 78, on which baggage is capable of being loaded, are provided outward of the article loading member 57 in the vehicle width direction, and the upper surface 61c of the article loading member 57 and the upper surfaces 78c of the side loading members 78 are formed at the same height. Accordingly, the load part on which baggage is capable of being loaded (the article loading member 57 and the left and right side loading members 78) further increases in area and thus increases in amount of load accordingly. Also, since no step is present between the article loading member 57 and the side loading members 78, large baggage can be loaded thereon more stably.

The above-described embodiment has merely illustrated one mode of carrying out the present invention. Any modifications and applications are possible without departing from the gist of the present invention.

For example, in the above-described embodiment, as illustrated in FIG. 3, the upper opening 68A and the lower opening 68B of the article storage unit 55 and the battery storage unit 56 are open to the rear side of the vehicle, but the present invention is not limited to this. The upper opening 68A and the lower opening 68B may be open to a lateral side of the vehicle.

Also, as illustrated in FIG. 3, the battery storage unit 56 stores the pair of left and right sub-battery storage cases 75, 75, and the left and right sub-battery storage cases 75, 75 stores the sub batteries 16B, but the present invention is not limited to such arrangement. The battery storage unit 56 may directly store the pair of left and right sub batteries 16B, 16B. In this case, the male connectors 91 (see FIG. 4) are provided to the battery storage unit 56, and the female connectors 88 (see FIG. 4) of the sub batteries 16B are connected to these male connectors 91.

The present invention is not limited to the case where it is applied to the four-wheeled electric vehicle 10. The present invention is also applicable to trunk boxes mounted at the rear of electric motorcycles and three-wheeled electric vehicles.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

EXPLANATION OF THE REFERENCE NUMERALS

10 ELECTRIC VEHICLE
13 REAR WHEEL
16B SUB BATTERY (BATTERY)
30B REAR FRAME
55 ARTICLE STORAGE UNIT
55b FIRST BOTTOM SURFACE
55c SECOND BOTTOM SURFACE
56 BATTERY STORAGE UNIT
56a BOTTOM SURFACE OF BATTERY STORAGE UNIT
57 ARTICLE LOADING MEMBER
61 FIRST LID
61c UPPER SURFACE
62 SECOND LID
62a INNER SURFACE
66 REAR UPPER CROSS FRAME (CROSS FRAME)
68 STORAGE OPENING PORTION (OPENING PORTION)
77 LID-SIDE GUIDE PORTION (GUIDE PORTION)
78 SIDE LOADING MEMBER
78c UPPER SURFACE
100 VEHICLE BODY FRAME.

What is claimed is:

1. A rear structure for an electric vehicle,
said electric vehicle comprising a vehicle body frame; a battery which serves as a drive source for the vehicle; a battery storage unit; and a second lid,
said rear structure comprising
an article storage unit supported on the vehicle body frame at a rear of a vehicle body; and
a first lid configured to cover the article storage unit from above; and
wherein:
the battery is stored in the battery storage unit disposed below the article storage unit;
each of the article storage unit and the battery storage unit includes an opening portion which is selectively openable to an outside;
the second lid is configured to cover the opening portions of the article storage unit and the battery storage unit;
the second lid is formed separately from the first lid;
the second lid includes an inner surface continuing to a bottom surface of the battery storage unit in a state where the second lid is open; and
a guide portion is provided on the inner surface of the second lid, the guide portion being configured to guide the battery when the battery is taken in and out of the battery storage unit.

2. The rear structure for an electric vehicle according to claim 1,
wherein first lid comprises an article loading member provided on an upper surface thereof, said article loading member configured to receive baggage for loading; and
the first lid in a closed state thereof is in contact with and supported by an upper surface of the vehicle body frame.

3. The rear structure for an electric vehicle according to claim 2, wherein a bottom surface of the battery storage unit is an inclined surface inclined obliquely upward towards a rear side of the vehicle body.

4. The rear structure for an electric vehicle according to claim 2,
wherein the article storage unit includes a first bottom surface and a second bottom surface formed at a position lower than a position of the first bottom surface; and
the second bottom surface is provided at a position closer to the corresponding opening portion than the position of the first bottom surface.

5. The rear structure for an electric vehicle according to claim 2,
wherein:
the upper surface of the first lid is inclined downward toward a front side of the vehicle body; and
the vehicle body frame includes a cross frame situated above and forward of the upper surface of the first lid, said cross frame being extending in a vehicle width direction.

6. The rear structure for an electric vehicle according to claim 5,
further comprising a side loading member which is configured to receive baggage for loading, said side loading member being provided outward of the article loading member in a vehicle width direction, and
wherein an upper surface of the article loading member and an upper surface of the side loading member are formed at a same height.

7. The rear structure for an electric vehicle according to claim 2, further comprising a side loading member which is configured to receive baggage for loading, said side loading member being provided outward of the article loading member in a vehicle width direction, and wherein an upper surface of the article loading member and an upper surface of the side loading member are formed at a same height.

8. The rear structure for an electric vehicle according to claim 1, wherein a bottom surface of the battery storage unit is an inclined surface inclined obliquely upward towards a rear side of the vehicle body.

9. The rear structure for an electric vehicle according to claim 8, wherein the article storage unit includes a first bottom surface and a second bottom surface formed at a position lower than a position of the first bottom surface; and the second bottom surface is provided at a position closer to the corresponding opening portion than the position of the first bottom surface.

10. The rear structure for an electric vehicle according to claim 8, wherein:

the upper surface of the first lid is inclined downward toward a front side of the vehicle body; and the vehicle body frame includes a cross frame situated above and forward of the upper surface of the first lid, said cross frame being extending in a vehicle width direction.

11. The rear structure for an electric vehicle according to claim 8, further comprising a side loading member which is configured to receive baggage for loading, said side loading member being provided outward of the article loading member in a vehicle width direction, and wherein an upper surface of the article loading member and an upper surface of the side loading member are formed at a same height.

12. The rear structure for an electric vehicle according to claim 1, wherein the article storage unit includes a first bottom surface and a second bottom surface formed at a position lower than a position of the first bottom surface; and the second bottom surface is provided at a position closer to the corresponding opening portion than the position of the first bottom surface.

13. The rear structure for an electric vehicle according to claim 12, wherein:

the upper surface of the first lid is inclined downward toward a front side of the vehicle body; and the vehicle body frame includes a cross frame situated above and forward of the upper surface of the first lid, said cross frame being extending in a vehicle width direction.

14. The rear structure for an electric vehicle according to claim 12, further comprising a side loading member which is configured to receive baggage for loading, said side loading member being provided outward of the article loading member in a vehicle width direction, and wherein an upper surface of the article loading member and an upper surface of the side loading member are formed at a same height.

15. The rear structure for an electric vehicle according to claim 1, wherein:

the upper surface of the first lid is inclined downward toward a front side of the vehicle body; and the vehicle body frame includes a cross frame situated above and forward of the upper surface of the first lid, said cross frame being extending in a vehicle width direction.

16. The rear structure for an electric vehicle according to claim 1, further comprising a side loading member which is configured to receive baggage for loading, said side loading member being provided outward of the article loading member in a vehicle width direction, and wherein an upper surface of the article loading member and an upper surface of the side loading member are formed at a same height.

* * * * *